US00RE34371E

United States Patent [19]

Rumpf et al.

[11] E Patent Number: Re. 34,371

[45] Reissued Date of Patent: Sep. 7, 1993

[54] LIGHTWEIGHT PROPPANT FOR OIL AND GAS WELLS AND METHODS FOR MAKING AND USING SAME

[75] Inventors: David S. Rumpf, North Tonawanda, N.Y.; Paul R. Lemieux, Ft. Smith, Ark.

[73] Assignee: Norton-Alcoa, Ft. Smith, Ark.

[21] Appl. No.: 824,022

[22] Filed: Jan. 22, 1992

Related U.S. Patent Documents

Reissue of:

[64] Patent No.: 4,921,820
Issued: May 1, 1990
Appl. No.: 297,876
Filed: Jan. 17, 1989

[51] Int. Cl.[5] ..... C04B 35/10

[52] U.S. Cl. ..... 501/128; 501/127; 501/133; 501/144; 166/280

[58] Field of Search ..... 501/133, 144, 127, 128; 166/280

[56] References Cited

U.S. PATENT DOCUMENTS

| | | | |
|---|---|---|---|
| 2,950,247 | 8/1960 | McGuire | 252/8.55 |
| 3,245,866 | 4/1966 | Schott | 161/168 |
| 3,437,148 | 4/1969 | Colpoys | 166/308 |
| 3,642,505 | 2/1972 | Bakker . | |
| 3,976,138 | 8/1976 | Colpoys | 166/280 |
| 4,068,718 | 1/1978 | Cooke et al. | 166/280 |
| 4,427,068 | 1/1984 | Fitzgibbon | 166/280 |
| 4,440,866 | 3/1984 | Lunghofer et al. | 501/127 |
| 4,462,466 | 7/1984 | Kachnik | 166/280 |
| 4,493,875 | 1/1985 | Beck et al. | 428/403 |
| 4,522,731 | 6/1985 | Lunghofer | 252/8.55 |
| 4,547,468 | 10/1985 | Jones et al. | 501/33 |
| 4,555,493 | 11/1985 | Watson et al. | 501/127 |
| 4,623,630 | 11/1986 | Fitzgibbon | 501/141 |
| 4,632,876 | 12/1986 | Laird et al. | 428/404 |
| 4,639,427 | 1/1987 | Khaund | 501/128 |
| 4,658,899 | 4/1987 | Fitzgibbon | 166/280 |
| 4,668,645 | 5/1987 | Khaund | 501/127 |
| 4,680,230 | 7/1987 | Gibb et al. | 428/403 |
| 4,713,203 | 12/1987 | Andrews | 264/117 |

FOREIGN PATENT DOCUMENTS

| | | |
|---|---|---|
| 101855 | 3/1984 | European Pat. Off. .. |
| 116369 | 8/1984 | European Pat. Off. . |
| 169412 | 1/1986 | European Pat. Off. . |
| 8503327 | 8/1985 | PCT Int'l Appl. . |

*Primary Examiner*—Karl Group
*Attorney, Agent, or Firm*—Weil, Gotshal & Manges

[57] ABSTRACT

A lightweight oil and gas well proppant made by simultaneously mixing and compacting a mixture of kaolin clay which has been calcined at a temperature low enough to prevent the formation of mullite and crystobalites to an LOI of 12 or less when tested at 1400° C., and amorphous to microcrystalline silica both of which have been milled to an average agglomerated particle size of 7 microns or less to form green pellets, and then drying, screening and sintering the pellets to form proppant pellets having a specific gravity of 2.7 or less, the proppant having a conductivity of at least 3,000 millidarci-feet as measured by the Stim-Lab Technique after 50 hours at 8,000 psi and 275° F. in the presence of deoxygenated aqueous 2% solution of KCl using sandstone shims.

21 Claims, No Drawings

LIGHTWEIGHT PROPPANT FOR OIL AND GAS WELLS AND METHODS FOR MAKING AND USING SAME

Matter enclosed in heavy brackets [ ] appears in the original patent but forms no part of this reissue specification; matter printed in italics indicates the additions made by reissue.

FIELD OF INVENTION

This invention relates generally to lightweight proppants for oil and gas wells and more particularly to lightweight proppants for oil and gas wells which are lighter in weight than existing lightweight proppants but which have strength and conductivity similar to and preferably substantially higher than such existing lightweight proppants, and to methods of making and using such proppants.

BACKGROUND

Hydraulic fracturing is a process of injecting fluids into a selected oil or gas bearing subsurface earth formation traversed by a well bore at sufficiently high rates and pressures such that the formation fails in tension and fractures to accept the fluid. In order to hold the fracture open once the fracturing pressure is released a propping agent (proppant) is mixed with the fluid which is injected into the formation.

Hydraulic fracturing increases the flow of fluids from an oil or gas reservoir to a well bore in at least three ways: (1) the overall reservoir area in communication with the well bore is increased, (2) the proppant in the fracture generally has significantly higher permeability than that of the formation, thereby allowing fluids to flow more easily and (3) the high conductivity channel causes large pressure gradients to be created in the reservoir past the tip of the fracture.

Proppants are generally strong, preferably substantially spherical, particulates that should be able to withstand the high temperatures and pressures and corrosive environments experienced in the subsurface formations surrounding an oil or gas well. Early proppants were formed of material such as glass beads, sand, walnut shells and aluminum pellets. These materials did not have sufficient strength or resistance to corrosion to be successful in many wells, particularly where closure pressures above a few thousand psi were experienced.

U.S. Pat. No. 4,068,718 to Cooke relates to a proppant which Cooke states is formed of "sintered bauxite" that has a specific gravity greater than 3.4. Cooke states that specific gravities above 3.4 are required in order that the proppant have sufficient compressive strength to resist fragmentation under the high stress levels experienced in use. While the proppant described in Cooke's example proved to have sufficient strength to resist crushing, the high specific gravity was undesirable since it required the use of higher viscosity fracturing fluids and resulted in a lower volumetric proppant concentration for a given weight of proppant loading in a fracturing fluid when compared with that achieved by a proppant of lower specific gravity. In general, the higher the volumetric concentration of the proppant in the fracturing fluid, the wider the propped fracture will be after the fracturing pressure is released.

U.S. Pat. No. 4,427,068 to Fitzgibbon relates to intermediate strength composite proppants made by mixing calcined diaspore clay, burley clay or flint clay with alumina, "bauxite" or mixtures thereof such that the ratio of alumina to silica in the composite mix is between nine to one and one to one. The powered starting materials are mixed in an Eirich mixer and while the mixing is in progress sufficient water is added to cause formation of composite spherical pellets from the powered mixture. Fitzgibbon states that the rate of water addition is not critical. The pellets are dried and then furnaced to sinter the pellets. The sintered pellets have a specific gravity of between 2.7 and 3.4.

U.S. Pat. No. 4,522,731 to Lunghofer relates to an intermediate strength proppant having an alumina content between 40% and 60% which is produced using a spray agglomeration process and which has a density of less than 3.0 gr/cc. In a preferred embodiment Lunghofer produces his proppants from "Eufaula bauxite" which it states is bauxitickaolin type material deposited in and around Eufaula, Alabama. According to Lunghofer, the Eufaula bauxite preferably contains at least some (above 5%) gibbsite.

U.S. Pat. No. 4,668,645 to Khaund relates to an intermediate strength proppant made from a mined "bauxitic clay" having a specified chemical composition.

The proppants described in the Fitzgibbons, Lunghofer and Khaund patents have specific gravities lower than that of the earlier Cooke proppant and proppants having such lower specific gravities have been used with some success in intermediate depth wells where the stress on the proppant is in the 5,000 to 10,000 psi range. It will be desirable, however, to have still lighter weight proppants which are easier to transport in the fracturing fluid and are therefore carried farther into the fracture before settling out and which will yield a wider propped fracture than the known lower specific gravity proppants. The lighter weight proppant should, however, have a conductivity rating at least as high as and preferably substantially higher than those obtainable with the presently available "lightweight" proppants.

The conductivity of a proppant under specific conditions of stress, temperature, corrosive environment and time is the single most important measure of its quality. The conductivity of a packed proppant such as might be deposited in a fracture is defined as the permeability of the proppant pack multiplied by the width of the propped fracture and is usually stated in units of millidarci-feet ("md-ft").

The conductivity of currently available intermediate strength proppants is frequently measured by the tentative API 8 hour procedure, "Tentative Fifth Draft of Recommended Practices For Evaluating Short Term Proppant Pack Conductivity", (March 1987) (hereinafter the "API 8 hour Procedure"), which procedure is hereby incorporated by reference.

Recently a consortium of some twenty-eight organizations involved in various aspects of the fracturing and stimulation business has sponsored research on ways of evaluating and improving stimulation techniques. Stim-Lab, Inc. of Duncan, OK acts as the testing arm of the consortium to develop consistent and repeatable testing procedures for proppants including tests for determining their permeability and conductivity. The long term conductivity testing techniques developed by Stim-Lab have been widely accepted in the industry and are described in a publication of the Society of Petroleum Engineers, No. SPE 16900, entitled "An Evaluation of the Effects of Environmental Conditions and Fracturing Fluids on the Long-Term Conductivity of Proppants" by G. S. Penny of Stim-Lab, Inc., which publication is hereby incorporated by reference. It should be understood that any gap in the description in the SPE publication should be filled in by reference to the API 8 hour Procedure. The testing techniques used by the applicants to determine the conductivity of the proppants of the present invention as they are intended to be supplied to a customer (referred to as the "Stim-Lab Technique") are essentially identical to those described in SPE publication No. 16900 using Monel-K 500 or sandstone shims in the conductivity cells, as noted herein. A single cell was used rather than stacking 4 cells in the manner described in the SPE publication. This however should have no effect on the measured results. The Stim-Lab Technique is considered to yield conductivity measurements that are repeatable to within about 5–10%.

SUMMARY OF THE INVENTION

In accordance with the invention there is provided a low density, high strength proppant which is formed of solid ceramic particles having a dry specific gravity less than 2.70 and preferably 2.60 or less and a conductivity of at least about 3,000 md-ft and preferably at least 4,000 md-ft after 50 hours at 8,000 psi and 275° F. in the presence of a deoxygenated 2% aqueous solution of KCl as measured by the Stim-Lab Technique using sandstone shims. Most preferably the conductivity is at least 4400 md-ft as measured under the above conditions.

The proppant of the invention may be produced by milling calcined kaolin clay and an amorphous to microcrystalline silica to an average particle size of less than 7 microns, and preferably about 3.0 microns or less and pelletizing a mixture of the resulting powers in a compacting mixer. Preferably the mixture contains between 55 weight percent ("w/o") and 90 w/o kaolinite and between 45 w/o and 10 w/o silica, although the percentages may fall outside these ranges. Kaolinite is normally the major component of the mixture. However, in the limit the silica content could reach 100% yielding a proppant of essentially all crystobalite having a specific gravity of about 2.33. The kaolinite and silica are preferably milled together.

The kaolin clay is calcined at a temperature of less than 900° C. to reduce the loss on ignition ("LOI") to 12 w/o or less when tested at 1400° C., and preferably to about 2 w/o LOI when tested at 1400° C. It is important that the calcining be done at a low enough temperature that the kaolin clay does not undergo a phase transformation to mullite and crystobalite. The silica should not contain any significant amount of crystalline quartz, other than amorphous to microcrystalline quartz as hereinafter defined, and is preferably dried to a LOI of about 1 w/o when tested at 1000° C.

Preferably, an organic binder is first dispersed in the milled material in the mixer and then water is added to the power at a controlled rate while mixing and compacting the power to form rough pellets of a desired size. Next, with the mixer still running, additional dry, milled material is slowly added to yield smooth, spherical pellets. The pellets are then dried and fired to convert the material to proppant pellets that preferably comprise [between about 35 (w/o) and 60 (w/o mullite, between about 35 w/o and 60 w/o] *primarily a mixture of mullite and* crystobalite and a minor amount (less than 10 w/o) of a glassy phase. The proppant has a specific gravity of less than 2.70 and preferably of 2.60 or less. [Most preferably the pellets comprises between 35 w/o and 50 w/o mullite and 50 w/o to 60 w/o crystobalite.]

In accordance with another aspect of the invention, the proppant is mixed with a fluid and injected into a subterranean formation under high pressure to open a fracture, with the proppant remaining in the fracture to prop it open after the fracturing pressure is removed. The measured conductivity of the proppants of the present invention are equal to and usually substantially better than those of other known lightweight proppants which have higher specific gravities and higher weight per unit of volume.

DETAILED DESCRIPTION

The preferred raw materials for use in making the low specific gravity, high strength proppants of the present invention are kaolin clay and amorphous to microcrystalline silica. Preferably the kaolin clay consists largely of kaolinite ($Al_2Si_2O_5(OH)_4$) and is essentially free of sand (*i.e.*, quartz). One source of such material is from C. E. Minerals, headquartered in King of Prussia, Pennsylvania. The kaolinite deposits owned by C. E. Minerals are mined at C. E. Minerals' Mulcoa operations in Andersonville, Georgia. The Andersonville kaolin deposits owned by C. E. Minerals are well described in a report by Alfred D. Zapp entitled "Bauxite Deposits of the Andersonville District, Georgia", U.S. Geological Survey Bulletin 1199-G. This report is incorporated herein by reference. The report states that the deposit consists largely of the mineral kaolinite and is essentially sand free. The chief impurities are compounds of iron and titanium and small amounts of gibbsite. The kaolin clay is deposited in tabular lenticular masses. Raw materials containing significant amounts of sand (free silica or quartz) produce a weaker proppant, while raw materials containing gibbsite or other hydrated aluminas yield a product having an undesirable high specific gravity.

By amorphous to microcrystalline silia is meant silica which is truly amorphous or is "amorphous" in the sense that the ultimate submicron particles, as seen with the aid of a scanning electron microscope, do not have the angular shape of crystals. One source of amorphous to microcrystalline silica is from Illinois Minerals Company in Cario, Illinois. This silica, as described by Illinois Minerals, is an extremely fine-grained microcrystalline silica formed by weathering of silica-rich limestone. Materials from other deposits of kaolinite and of amorphous to microcrystalline silica can also be used in making the proppants of the present invention.

In general the kaolin clay most useful as a raw material in making the proppants in accordance with the invention may contain by chemical analysis about 45 w/o alumina and 52 w/o silica, less than 1 w/o iron oxide and less than 2 w/o (preferably less than 1 w/o) free quartz. Preferably the kaoline clay approaches 100% kaolinite. Most preferably the amount of free quartz is non-detectable.

Other naturally occurring minerals which may be present in minor or trace amounts include anatase and rutile. Minerals whose presence in the raw material appear to be somewhat detrimental to the properties of the final product include quartz, pyrite, marcasite, siderite, micas and montmorillonites. The amorphous to microcrystalline silica most useful as a raw material in making the proppants in accordance with the invention should contain by chemical analysis at least 94 w/o (preferably 100 w/o) silica.

The kaolin clay is preferably calcined before further processing in order to remove water and organics. In accordance with the invention, applicants have found that the calcining should be performed at a temperature low enough that the kaolin clay does not undergo a phase change to form mullite or crystobalite. Applicants have found that the presence of any significant amount of mullite or crystobalite in the kaolin clay before the final drying and firing steps has a severely detrimental effect on the properties of the proppants produced. Therefore the calcining should be performed at a temperature below 900° C. for a sufficient time that the loss on ignition ("LOI") of the kaolinite is 12 w/o or less and preferably 2 w/o or less when tested at 1400° C. The calcining may be performed relatively quickly at temperatures on the order of 700° to 800° C. or may be performed more slowly at lower temperatures. If the calcining temperature is above about 450° to 500° C., the kaolinite is converted to amorphous alumina and silica (sometimes referred to as "meta kaolinite"). Such a transformation, however, has no adverse effect on the product of the invention and such transformed material will still be referred to herein as kaolinite. The silica should be dried after mining to an LOI of less than 1 w/o when tested at 1,000° C. This drying is typically done at temperatures of between about 150° and 200° C.

The calcined material and the silica is then reduced in particle size, preferably by dry ball milling them in a closed loop system containing a particle classifier. The average agglomerated particle size in this milled material is less than 7 microns and preferably about 3.0 microns or less as measured by a Sedigraph (Micro Meritics Instrument Corp.) or a Granulometer' (Cilas Compagnie Industrielle des Lasars). The true ultimate particle size, however, of the milled raw material (both the kaolin and silica) is much finer than 3.0 microns and is believed to be made up of submicron flakes or particles. Such submicron flakes or particles tend to agglomerate to form the composite particles which are sensed by the measuring instruments. The calcined kaolin clay and silica are mixed together and [preferable] *preferably* are milled together. The mixture preferably contains between 55 w/o and 90 w/o kaolinite and between 45 w/o and 10 w/o silica, although different percentage mixtures may be used. Kaolinite is normally the major component of the mixture. However, in the limit the amorphous to microcrystalline silica content can reach 100%, yielding a proppant that is essentially entirely crystobalite having a specific gravity of about 2.33. Such a super lightweight proppant would be very useful in shallow wells when closure stresses are on the order of 4000 psi or less.

The milled raw material is pelletized preferably in a compacting mixer. The preferred commercially available machines for this purpose are the Eirich Countercurrent Intensive Mixers which are manufactured in several sizes of different capacities by the Maschinenfabrik Gustav Eirich of Hardheim, West Germany and distributed in the United States by Eirich Machines, Inc., New York, N.Y.

The Eirich mixer has a rotation mixing pan forming the bottom of the mixing chamber which pan can be either horizontal or inclined at an angle and a "mixing star" which rotates in the opposite direction from the pan. The mixing star rotates about an axis parallel to and offset from that of the pan and has a diameter of about 20 to 25 percent of that of the pan. The preferred form of mixing star for the pelletizing operation is referred to by Eirich as a suction type rotor and has a plurality of vertically extending trapidzoidally shaped mixing elements which extend from the periphery of the rotating element. For the Model R7 machine, the pan has a single rotational speed of about 45 rpm, while the mixing star has a low and a high speed. The low speed is about 700 rpm and the high speed is about twice that, about 1400 rpm. The rotational speeds of the elements of the larger mixers are adjusted so that rotating elements have similar tip speeds. The mixer may also contain a second mixing star upon which can be mounted plows for cleaning the sides of the rotating pan. This second mixing star is also mounted eccentrically in the mixer and rotates in the opposite direction from the mixing pan. An example of another compacting mixer that is believed suitable for use in the present invention is the Littleford Lodige mixer.

The milled powder charge is preferably first mixed dry in the mixer with up to about 3 w/o (calculated on the basis of the initial milled powder charge) of an organic binder such as gelatinized cornstarch for a period of about 30 seconds with the suction rotor on the low speed setting in order to fully disperse the binder in the raw material powder.

It is preferred that such binders be such that they are pyrolized or driven off during later firing of the proppant pellets. The amount of the binder is normally on the order of 1 w/o to 3 w/o of the initial milled powder charge. It is possible to make pellets with the method of the invention without a binder but it is believed that the use of a binder results in improved properties and yield.

Next water is added at a controlled rate to the mixer with the suction rotor running at the low speed setting to initially pelletize the material. The rate of water addition should be controlled properly to facilitate the formation of the pellets in the mixer and can affect the quality of the final product. Typically the total amount of water for the Model R7 Eirich mixer is from about 35 to 55 w/o of the initial starting material and preferably about 43 to 50 w/o. Preferably between about 40 and 60 w/o of the expected total amount of water is added after the binder is dispersed and mixed for about 2 to 4 minutes. Thereafter additions of about 8 to 10% of the total water are made about every 0.75 to 1.5 minutes until irregularly shaped pellets ranging in size from about 1/16 to ⅛ inch in diameter are formed.

Once pellets have formed in the mixer, which at this point are normally large and irregularly shaped, the suction rotor is switched to the high speed setting and additional milled calcined raw material (referred to as "dust") is slowly added to the mixer over a period of about 5 to 7 minutes in order to cause the pellets to become smaller, well shaped spheres of a narrower size distribution, typically 0.02 inches to 0.047 inches. Typically, the amount of dust required to form the desired size spheres is about 42 to 70 w/o of the starting raw material. Preferably about 46 to 54 w/o dust is added.

In some cases the suction rotor is switched back to the low speed setting for a later portion of the 5 to 7 minute period after a major portion of the dust has been added to the mixer. After adding the dust, the suction rotor is then preferably set back to the low speed setting if it has not already been and the mixer run for a further period of about 30 seconds in order to improve the sphericity of the pellets and to increase yield of the desired size range.

The amount and rate of water and dust additions to the mixer can have a significant impact on the conductivity of the proppant produced by the method of the invention. If too much water is added, the particles are poorly shaped and are too large. If the dust is added too quickly it results in a poor yield of particles in the desired size range. If not enough dust is added the particles are poorly shaped and will stick together in agglomerated masses. If too much dust is added the particles have a rough surface and unconsolidated dust remains in the mixer. When the right amount of dust is added, the process yields smooth, spherical, well compacted pellets.

The speherical pellets are next discharged from the mixer and dried to a free moisture content of less than 10% and preferably less than 5%. The drying temperature and time does not appear to be critical and it has been found, for instance, that drying at temperatures of 150° C. overnight, or of 260° C. for 10 to 15 minutes are suitable. Once dried, the desired size spherical pellets are separated by screening for instance to a 18/35 mesh size. The larger than 18 mesh and finer than 35 mesh are recycled to be repelletized. The screened particles in the desired size range are then sintered, for instance in a rotary kiln, at a temperature between 1300° and 1500° C., preferably between 1375° to 1425° C. for about 15 to 30 minutes at temperature. The total time in the kiln is normally from about 1 to 1½ hours. The particles shrink upon firing by about 15% to 20%. The desired finished size is typically between about 0.0167 inches and 0.0331 inches but can be larger or smaller as needed. The particular temperature to which the screened particles are fired is selected in order to maximize their strength. This temperature depends on several variables, some of which are the raw material mineralogy, the milled particle size, the pellet size and the volume of material in the kiln.

After firing, the pellets are again screened to the desired final size. A typical product size is 20/40 mesh which contains 90 w/o of its pellets of between 0.0167 inches and 0.0331 inches in size and preferably 90 w/o of the pellets between about 0.0232 inches and 0.0331 inches in size.

The proppants of the invention have been found to have suprisingly and unexpectedly high conductivities for having such low specific gravities. More particularly, the conductivities of the proppants of the preferred embodiment of the present invention are at least 3000 md-ft and preferably at least 4000 md-ft after 50 hours at 8000 psi and 275° F. in the presence of a deoxygenated 2% aqueous solution of KCl as measured by the Stim-Lab Technique using sandstone shims. Most preferably the conductivity is at least 4500 md-ft when measured under the above conditions. The proppants of the present invention have specific gravities of less than 2.70, and preferably 2.60 or less, which are lower than those of other commercially available lightweight proppants. In fact, the preferred proppants of the present invention are even lighter than sand (specific gravity 2.64), the lightest proppant which has heretofore been in common commercial use. The conductivity of the proppants of the present invention are between about 3 and 20 times that of sand, however, depending upon operating conditions. Sand is of little use at pressures on the order of 8000 psi while the preferred proppants of the present invention still have high conductivities, on the order of as much as 4500 md-ft, at such pressures.

Compared to another heavier commercially available proppant which is considered to be in the lightweight range, the preferred proppants of the present invention have substantially higher conductivities. The commercially available "lightweight" proppant has been measured in accordance with the Stim-Lab technique to have a conductivity of 6067 md-ft after 50 hours at 250° F. and 6000 psi closure stress in the presence of deoxygenated aqueous 2% KCl solution using sandstone shims. A proppant in accordance with the preferred embodiment of the present invention had conductivity values of 7855 md-ft when measured under the same conditions. The same commercially available "lightweight" proppant had conductivities measured by the Stim-Lab technique of 3616 to 3700 md-ft after 50 hours at 275° F. and 8000 psi while the proppant of the present invention had a conductivity of 4459 md-ft under similar conditions.

The Loose Pack Bulk Density (LPBD) of the proppant of the invention used in the above example is 1.45 gms/cm$^3$. The LPBD of the commercially available "lightweight" proppant used for comparison in the above example is 1.61 gm/cm$^3$. Their specific gravities were 2.56 and 2.70 respectively.

From a mineralogical point of view the sintered pellets of the present invention are preferably [between about 35 w/o and 60 w/o mullite and between about 35 w/o and 60 w/o] *primarily a mixture of mullite and* crystobalite and a minor amount (less than 10 w/o) of a glassy phase. It is believed that the glassy phase is best minimized for the highest quality product.

EXAMPLES

The invention is further illustrated by reference to the following non-limiting examples wherein all percentages are by weight unless otherwise specified. When applicable calcining conditions and milling techniques for each raw material are given with each example. Unless otherwise indicated, the pellets are screened to an 18/35 mesh size after drying and to a 20/30 mesh size after sintering wherein 90% of the pellets are between about 0.0232 inches and 0.0331 inches in size. The typical yield of properly [size] *sized* pellets in the first screening is about 70%. The chemical compositions of the raw materials used in the following examples are summarized in Table I. The mineralogical composition of the calcined kaolin clays as measured by the X-ray diffraction technique is summarized in Table II. The kaolinite in both the Huber 40-C clay and the Mulcoa clay have been transformed to amorphous alumina and silica by being calcined at 750° C. and thus are not detected by X-ray diffraction. The figures in Table II for the ACCO clay are for the uncalcined material so that kaolinite is detected. Mineralogically the silicas used in the examples is of such a fine grain size as to be virtually undetectable as measured by X-ray diffraction techniques. The components in Table II are divided into major minerals which comprise about 95 w/o of the detected minerals present and the minor minerals which together make up less than 5 w/o of the detected minerals present. Kaolinite is approximately 45 w/o $Al_2O_3$. After calcining or drying all the raw materials are milled to an average particle size of about 3 microns as measured by a Granulometer. About 90% of the particles were measured to be less than 10 microns in size.

TABLE I

| Chemistry | Example 1 Huber 40-C Clay | 2 ACCO Clay | 3 Mulcoa Clay | 4 (Silica) |
|---|---|---|---|---|
| $Al_2O_3$ | 45.0 | 45.9 | 43.7 | 0.7 |
| $SiO_2$ | 53.0 | 51.4 | 51.8 | 99.0 |
| $TiO_2$ | 1.8 | 1.8 | 1.7 | 0.5 |
| $Fe_2O_3$ | 0.2 | 0.9 | 0.8 | 0.5 |

TABLE II

| Mineralogy | Example 1 | 2 | 3 |
|---|---|---|---|
| Major Minerals | | | |
| Kaolinite | ND | Major | ND |
| Minor Minerals | | | |
| Anatase | Major | Major | Trace |
| Rutile | ND | Trace | ND |
| Quartz | ND | ND | Trace |
| Mullite | ND | ND | ND |
| Amorphous | Yes | No | Yes |

Where "ND" means non-detectable

EXAMPLE I

One hundred (100) lbs. of a kaolin clay/silica mixture was produced by combining 86 lbs. of calcined Huber 40-C kaolin clay (manufactured by J. M. Huber Corporation) and 14 lbs. of dried Imsil A-108 microcrystalline silica (manufactured by Illinois Minerals Company) in an Eirich Model R-7 Compacting Mixer and mixing the two ingredients together for 60 seconds. Both the calcined kaolin clay and the silica had been milled separately to an average particle size of 3 microns as measured by a Granulometer. Hereafter in this example this mixture will be referred to as "blended material".

A 50 lbs. charge of blended material was placed in an Eirich Compacting Mixer having an inclined pan and a suction type rotor along with ½ lbs. of gelatinized cornstarch binder and mixed for 30 seconds with the suction rotor in its low speed setting in order to fully disperse the binder in the blended material. With the suction rotor rotating at its low speed setting, 9 lbs. of water was added to the mixer and mixed for a period of two minutes. As the suction rotor continued to operate in the low speed setting, seven 2 lb. additions, followed by 1 lb. addition and then a ½ lb. addition of water were added sequentially to the mixer with a 45 second mixing period after each addition. At this point irregularly shaped pellets had formed.

The rotor was then switched to the high speed setting and an additional 17 lbs. of the same blended material was slowly added to the mixer over a three minute period. Then the rotor was reset to its low speed setting and additional 11 lbs. of the blender material was added over a period of two minutes. The mixing was continued with the suction rotor in the low speed setting for an additional period of 30 seconds. At this point the particles had fairly good sphericity but had rather rough surfaces. An additional 7 lbs. of the blended material was slowly added to the mixer over a 1 minute period and the material mixed for an additional 30 seconds with the suction rotor continuing in the low speed setting. The pellets now had a good spherical shape and smooth surfaces. The pellets were discharged from the mixer and dried overnight at 150° C. in a box oven. After drying the pellets were screened to an 18/35 mesh and fired at 1405° C. in a rotary kiln for a period of about 30 minutes at temperature with a total time in the kiln of approximately 1 hour 15 minutes. After cooling the pellets were screened to a 20/30 mesh. The dry specific gravity of the material was 2.56 as measured by a Beckman air comparison pycnometer Model 930.

A conductivity test using the Stim-Lab Technique referred to above was conducted with final closure stress of 6,000 psi at 250° F. in the presence of deoxygenated aqueous 2% solution of Kcl for 50 hours. In accordance with this procedure 63.06 grams of the screened proppant pellets were loaded into a API Hasteloy-C 10 $in^2$ linear flow cell to give a loading of 2 lbs./$ft^2$ of proppant and leveled loosely with a universal bevel blade device. A ⅜ inch thick sandstone core was placed on top of the test pack followed by an O ring fitted to a piston which was lightly coated with vacuum grease. The loaded test cell was then placed in a 150 ton Dake press and the closure stress was increased to 500 psi at a rate of 100 psi/min. The cell was saturated with deoxygenated aqueous 2 w/o KCl solution and then purged of air at the ambient laboratory temperature of 70° F. to 80° F. A Validyne DP15-30 differential pressure transducer connected across the cell was calibrated with water columns to 0.0001 psi accuracy. Closure stress was then raised to 1,000 psi at a rate of 100 psi/min. A Reservoir Accumulator, made up to two 5 gal and two 1 gal nitrogen driven fluid reservoir accumulators which were filled with a 2 w/o KCl aqueous solution that had been deoxygenated with nitrogen to a level of less than 15 ppb and preferably less than 5 ppb of oxygen was connected to the test cell and set at a driving pressure of 400 psi. The connection of the Reservoir Accumulator to the cell is made through two 150 ml sample cylinders filled with 100 mesh Oklahoma #1 sand with ceramic band heaters in order to saturate the test fluid with silica. It should be noted that the closure stresses on the proppant pack in the cell are stated in terms of the net closure stress on the pack which is equal to the gross pressure applied by the press minus the 400 psi pressure applied by the reservoir accumulator.

The system was allowed 30 minutes to come to equilibrium and a series of five conductivity measurements were taken and averaged. The conductivity was calculated from the darci relationship:

$$K_{wf}=26.78\ \mu Q/P$$

where kwf = Conductivity (md-ft)

26.78 = factor to account for a 1½×5 inch flow area and pressure in psi $\mu$ = Viscosity of flowing fluid at temperature (cp)

Q = Flow rate (ml/min)

P = Pressure differential across 5 inch flow path.

After the readings were taken at ambient temperature, the temperature was increased to 250° F. and held for 8 hours for temperature uniformity. Next readings with the system at 250° F. were taken at 1,000 psi, 2,000 psi, 4,000 psi and 6,000 psi with the closure stress being raised between levels at a rate of 100 psi/min. After reaching each of the 1,000, 2,000 4,000 and 6,000 closure stress levels, the system was held at 250° F. for 1.5 hours before the conductivity readings were taken. At the 6,000 psi level the cell was held at 250° F. for 50 hours during which conductivity measurements were taken at 10 hour intervals. The measured conductivity at the 50 hour time was 7,351 md-ft and 7,084 md-ft on a second sample of the raw material run at the same time.

EXAMPLE II

In this example a kaolin clay was obtained from the American Cyanamid Co., Andersonville, Ga. The chemical and mineralogical composition of the uncalcined clay as indicated in Table I and II. This kaolin clay was calcined at 480° C. for approximately 24 hours then crushed to less than ⅛". The crushed kaolin clay was combined with 250 grade air-floated microcrystalline silica provided by the Illinois Minerals Company. This mixture contains 75 w/o clay and 25 w/o silica and hereafter will be referred to as "blended material" in this example. The mixture was tumbled in a "V" blender for approximately 2 minutes to insure complete mixing.

The blended material was next reduced in particle size using a jet mill manufactured by the Fluid Energy Processing Equipment Company of Hatfield, Pa. The average particle size of this milled material was 3.68 microns as measured by the Leads and Northrup Microtrac II particle size analyzer.

A 45 lb. charge of this blended material was placed in the Eirich Model R-7 Compacting Mixer described in Example I along with 1½ lbs. of cornstarch binder and mixed dry for 30 seconds at the low speed setting. Water was then added to the mixer with the mixer operating at the low speed setting with 9 lbs. being added and mixed for 2 minutes followed by 4 additions of 2 lbs. each, one addition of 1 lb. and three additions of ½ lb., with a 45 second mixing period after each addition.

The mixer was then set to the high speed mode and 10 lbs. of the blended material was slowly added to the mixer over a minute period. The mixer was then switched back to the low speed setting and an additional 7 lbs. of the blended material was slowly added over a 2 minute period, followed by a 30 second low speed mixing. An additional 3 lbs. of the blended material was added over the following minute followed by an additional 30 second mixing period at the low speed. Then a final 3 lbs. of the blended material was added over the following minute followed by an additional 30 second mixing period at low speed. The particles were thereafter discharged from the mixer and screened, dried and fired in the same manner as described in Example I with the exception that the sintering temperature was 1395° C. After cooling the pellets were screened to a 20–30 mesh size. The dry specific gravity of the material was 2.52. The Stim-Lab conductivity test described in connection with Example I was then performed except that the readings at the elevated temperature were taken at 275° C. and the maximum stress was 8000 psi. The test yielded a measured conductivity after 50 hours at 8,000 psi and 275° F. of 3,351 md/ft.

EXAMPLE III

In this example a kaolin clay was obtained from C. E. Minerals. This clay was mined at their Mulcoa operation in Andersonville, Ga. The chemical and mineralogical composition of the calcined clay is indicated in Tables I and II. For this example the clay was calcined in a rotary kiln at 750° C. and held at that temperature for 2 hours. This clay was next crushed to minus ⅛ inch then milled in a similar method as the material in Example II. The average particle size of the milled clay in this example was 3.01 microns as measured by the Leads and Northrup Microtrac II. This milled clay was then mixed with Imseil A-108 silica in a similar manner as in Example I, the ratio again being 86% clay and 14% silica. Again as in the previous examples this mixture will be referred to as "blended material" hereafter in this example.

A 45 lbs. charge of this blended material was placed in the Eirich Model R-7 Compacting mixer described in Example I along with 1½ lbs. or cornstarch binder and mixed with water in the same manner as described in Example I with the exception of adding 2 lb. additions to 17 lbs. then 1lb. additions to 21 lbs. then a ½ lb. addition.

Next 13 lbs. of blended material was slowly added over a minute period with the mixer in the high speed setting. Next the mixer was switching back to the low speed setting and an additional 8 lbs. of blended material was added over a period of 2 minutes after which the mixer continued to be operated for an additional 30 seconds mixing time. The pellets formed of this procedure were slightly wet but had a good spherical shape. The pellets were then removed from the mixer and dried, screened (both before and after sintering) and sintered in the same sintering temperature used was 1,385° C.

The Stim-Lab conductivity test described in Example II was then performed on the proppant resulting in a conductivity measurement of 4,459 md-ft. after 50 hours at 8,000 psi at 275° F. The dry specific gravity of the proppant was 2.59.

In accordance with the method of the present invention the low density high strength proppant particles of the present invention may be injected into fractures in subsurface formation as a propping agent. In fracturing treatment a viscous fluid, often referred to as a "pad" is injected into the well at extremely high pressure to cause the formation to fail in tension and fracture to accept the fluid. The fracturing fluid may be an oil base, water base, acid, emulsion, foam or other fluid. Normally the fluid contains several additives such as viscosity builders, drag reducers, fluid loss additives, corrosion inhibitors, cross linkers and the like. The fluid of the pad is injected until and fracture of sufficient geometry is obtained to permit the placement of the proppant pellets. Normally the treatment is designed to provide a fracture at the well bore of at least 2½ times the diameter of the largest proppant pellet. Once a fracture of the desired geometry is obtained, the proppants are carried suspended in the fluid pad and placed in the fractures. Following placement of the proppant, the well is shut-in for a length of time sufficient to permit the pressure to bleed off into the formation which in turn causes the fracture to close and exert closure stress on the proppant particles. The shut-in period may vary from a few minutes to several days. The proppant particles of the present invention are particularly suitable for use as propping agents in wells of depths less than about 14,000 feet.

What is claimed is:

1. A low density proppant comprising solid sintered ceramic pellets which prior to sintering consist essentially of a mixture of a kaolin clay and amorphous to micro-crystalline silica, said clay being substantially free of quartz and, prior to sintering, having been maintained at a temperature low enough to prevent a phase transformation of said kaolin clay to mullite and crystobalite, said pellets having specific gravity of less than 2.70, such proppant having a conductivity of at least 3,000 md-ft after 50 hours at 8,000 psi and 275° F. in the presence of deoxygenated aqueous 2% solution of KCl as measured by the Stim-Lab Technique using sandstone shims.

2. The proppant of claim 1 wherein said pellets have a specific gravity of 2.6 or less.

3. The proppant of claim 1 wherein said pellets are produced by the method comprising the steps of:

pelletizing an initial amount of material, which consists essentially of a mixture of milled, calcined kaolin clay and amorphous to microcrystalline silica by simultaneously mixing and compacting said material while adding water at a controlled rate;

adding additional amounts of said material at a controlled rate while continuing said simultaneous mixing and compacting to form pellets therefrom in a desired size range; and drying and sintering said pellets.

4. The proppant of claim 3 wherein said step of pelletizing further includes dispersing an organic binder in said material prior to adding water.

5. The proppant of claim 3 wherein said kaolin clay is calcined at a temperature of less than 900° C.

6. The low density proppant of claim 3 wherein said method further includes the steps of:

milling said kaolin clay and said silica to an agglomerated particle size of 7 microns or less.

7. The proppant of claim 6 wherein said calcined kaolin clay and silica are milled together.

8. The low density proppant of claim 6 wherein said calcined kaolin clay and silica are milled to an agglomerated particle size of 3 microns or less.

9. The proppant of claim 5 wherein said kaolin clay is calcined to an LOI of 12 w/o or less when tested at 1400° C.

10. The proppant of claim 9 wherein said kaolin clay is calcined to an LOI of 2% w/o or less when treated at a temperature of 1400° C.

11. The proppant of claim 1 having a conductivity of at least 4,000 md-ft after 50 hours at 8,000 psi and 275° F. in the presence of deoxygenated aqueous 2% solution of KCl as measured by the Stim-Lab Technique using sandstone shims.

12. The proppant of claim 1 wherein said clay contains less than 1% quartz prior to sintering.

13. The proppant of claim 1 [consisting essentially of] *comprising* mullite and crystobalite.

14. A low density proppant comprising solid ceramic pellets [consisting essentially of] *comprising* mullite and crystobalite and having a dry specific gravity of about 2.6 or less, said proppant having a conductivity of at least 3,000 md-ft after 50 hours at 8,000 psi and 275° F. in the presence of deoxygenated aqueous 2% solution of KCL as measured by the Stim-Lab Technique using sandstone shims.

15. The low density proppant of claim 14 wherein said proppant has a conductivity of at least 4000 md-ft after 50 hours at 8000 psi and 275° F. in the presence of a deoxygenated aqueous 2% solution of KCl as measured by the Stim-Lab Technique using sandstone shims.

[16. The support of claim 14 wherein said pellets contain between 35 w/o and 60 w/o mullite, between 35 w/o and 60 w/o crystobalite, and less than 10 w/o of a glassy phase.]

17. A low density proppant comprising sintered pellets [consisting essentially of] *comprising* mullite and [at least 35%] crystobalite and which prior to sintering consist essentially of a mixture of between 0 w/o to 90 w/o calcined kaolin clay and 10 w/o to 100 w/o amorphous to micro-crystalline silica, said kaolin clay containing less than 2 w/o quartz and less [that] *than* 1 w/o iron, said mixture being substantially free of mullite and crystobalite prior to sintering, said pellets having a density of less than about 2.6, said calcined kaolin clay and silica having been milled to an average particle size of less than 7 microns.

18. The proppant of claim 17 wherein said calcined kaolin clay and silica are milled to an agglomerated particle size of 3 microns or less prior to sintering.

19. The proppant of claim 18 wherein said kaolin clay is calcined to an LOI of less than 12 w/o when tested at 1400° C.

20. The proppant of claim 17 having a conductivity of at least 4,000 md-ft after 50 hours at 8,000 psi and 275° F. in the presence of deoxygenated aqueous 2% solution of KCl as measured by the Stim-Lab Technique using sandstone shims.

[21. A low density proppant comprising about from 35 w/o to about 60 w/o mullite and about 35 w/o to about 60 w/o crystobalite, having a specific gravity of less than 2.70, and having a conductivity of at least 3,000 md-ft after 50 hours at 8,000 psi and 275° F. in the presence of deoxygenated aqueous 2% solution of KCl as measured by the Stim-Lab Technique using sandstone shims, with less than 10% of said proppant being a glassy phase.]

* * * * *